(12) United States Patent
Izawa et al.

(10) Patent No.: US 10,093,210 B2
(45) Date of Patent: Oct. 9, 2018

(54) VEHICLE SEAT

(71) Applicant: TS TECH CO., LTD., Asaka-shi, Saitama (JP)

(72) Inventors: Hiroshi Izawa, Tochigi (JP); Toshiaki Shimada, Tochigi (JP); Yasuhiro Tsuji, Wako (JP)

(73) Assignee: TS TECH CO., LTD., Saitama (JP)

( * ) Notice: Subject to any disclaimer, the term of this patent is extended or adjusted under 35 U.S.C. 154(b) by 41 days.

(21) Appl. No.: 15/113,351

(22) PCT Filed: Jan. 20, 2015

(86) PCT No.: PCT/JP2015/051306
§ 371 (c)(1),
(2) Date: Jul. 21, 2016

(87) PCT Pub. No.: WO2015/111561
PCT Pub. Date: Jul. 30, 2015

(65) Prior Publication Data
US 2017/0106777 A1    Apr. 20, 2017

(30) Foreign Application Priority Data
Jan. 22, 2014    (JP) ................................ 2014-009929

(51) Int. Cl.
*B60N 2/68*    (2006.01)
*B60N 2/90*    (2018.01)

(52) U.S. Cl.
CPC ............... *B60N 2/68* (2013.01); *B60N 2/986* (2018.02)

(58) Field of Classification Search
CPC ........... B60N 2/68; B60N 2/682; B60N 2/686
See application file for complete search history.

(56) References Cited

U.S. PATENT DOCUMENTS 2,137,726 A * 11/1938 Miller .................... B60N 2/682
                                                        5/409
4,493,505 A *  1/1985 Yamawaki ........... B60N 2/3013
                                                        296/63

(Continued)

FOREIGN PATENT DOCUMENTS

JP    58-174027 A    10/1983
JP    63-43250 B2     8/1988

OTHER PUBLICATIONS

International Search Report issued in PCT/JP2015/051306, dated Mar. 10, 2015 (1 page).

*Primary Examiner* — Timothy J Brindley
(74) *Attorney, Agent, or Firm* — Hamre, Schumann, Mueller & Larson, P.C.

(57) ABSTRACT

An automotive rear seat (1) includes a seat cushion (2) and a seat back (6). The seat back (6) includes a seat back main body portion (10) and a seat back side portion (20) disposed on one side of the seat back main body portion (10). The seat back side portion (20) is fixed to a vehicle body (body frame (FR)) or the seat cushion (2) via a first attachment portion (30) provided on a lower portion of the seat back side portion (20), and the seat back side portion (20) includes, at a position different from a position at which the first attachment portion (30) is provided, a rotation-restricting portion (40) configured to contact the vehicle body or the seat cushion (2) to restrict rotation of the seat back side portion (20).

20 Claims, 7 Drawing Sheets

(56) References Cited

U.S. PATENT DOCUMENTS

| | | | | |
|---|---|---|---|---|
| 4,509,796 A * | 4/1985 | Takagi | ................... | A47C 7/16 297/452.55 |
| 4,636,005 A * | 1/1987 | Bolz | ................... | B60N 2/366 292/1 |
| 6,491,346 B1 * | 12/2002 | Gupta | ................... | B29C 49/4802 297/232 |
| 9,643,524 B2 * | 5/2017 | Behrens | ................... | B60N 2/686 |
| 2003/0160482 A1 * | 8/2003 | Yanai | ................... | B60N 2/3013 297/216.13 |
| 2004/0155511 A1 * | 8/2004 | Garnweidner | ....... | B60N 2/5825 297/452.18 |
| 2004/0201265 A1 * | 10/2004 | Ichikawa | ................... | B60N 2/3013 297/354.13 |
| 2007/0262630 A1 * | 11/2007 | Sawada | ................... | B60N 2/682 297/378.12 |
| 2008/0018161 A1 * | 1/2008 | Evans | ................... | B60N 2/3013 297/440.14 |
| 2011/0140480 A1 * | 6/2011 | Nakamura | ........... | B60N 2/3013 296/187.05 |
| 2011/0285161 A1 * | 11/2011 | Sweers | ................... | B60N 2/015 296/37.1 |
| 2012/0068506 A1 * | 3/2012 | Yannaki | ................... | B60N 2/0232 297/216.1 |
| 2012/0223565 A1 * | 9/2012 | Yasui | ................... | B60N 2/68 297/452.1 |
| 2012/0319449 A1 * | 12/2012 | Schenten | ................... | B60N 2/2245 297/452.18 |
| 2013/0009444 A1 * | 1/2013 | Wilson | ................... | B60N 2/242 297/463.1 |
| 2013/0015694 A1 * | 1/2013 | Tosco | ................... | B60N 2/4808 297/452.18 |
| 2013/0093226 A1 * | 4/2013 | Mitsuhashi | ................... | B60N 2/68 297/232 |
| 2013/0241108 A1 * | 9/2013 | Zynda | ................... | B60N 2/686 264/279 |
| 2013/0341991 A1 * | 12/2013 | Matsuzaki | ................... | B60N 2/68 297/452.18 |
| 2015/0001906 A1 * | 1/2015 | Line | ................... | B60N 2/4808 297/403 |
| 2015/0076886 A1 * | 3/2015 | Ribaric | ................... | B29C 45/14786 297/452.1 |
| 2015/0083872 A1 * | 3/2015 | Ito | ................... | B60N 2/289 248/205.1 |
| 2015/0175038 A1 * | 6/2015 | Kaneda | ................... | B60N 2/682 297/378.12 |
| 2015/0328811 A1 * | 11/2015 | Koever | ................... | B29C 70/48 297/452.18 |
| 2015/0336528 A1 * | 11/2015 | Tanabe | ................... | B60R 21/207 280/728.2 |
| 2016/0009203 A1 * | 1/2016 | Contorbia | ................... | B60N 2/36 297/378.1 |
| 2016/0121771 A1 * | 5/2016 | Rosander | ................... | B60N 2/682 228/174 |
| 2016/0152191 A1 * | 6/2016 | Fukatsu | ................... | B60R 11/00 297/188.04 |
| 2017/0232877 A1 * | 8/2017 | De Nichilo | ................... | B60N 2/72 297/452.18 |
| 2017/0259719 A1 * | 9/2017 | Hamano | ................... | B60N 2/68 |
| 2017/0349133 A1 * | 12/2017 | Line | ................... | B60N 2/42745 |
| 2017/0368973 A1 * | 12/2017 | Seo | ................... | B60N 2/682 |
| 2018/0126885 A1 * | 5/2018 | Hartmann | ................... | B60N 2/682 |

* cited by examiner

VEHICLE SEAT

TECHNICAL FIELD

The present invention relates to a vehicle seat comprising a seat cushion and a seat back, and more specifically to a vehicle seat in which the seat back comprises a seat back main body portion and a seat back side portion disposed on one side of the seat back main body portion.

BACKGROUND ART

There is known a conventional structure in which an attachment portion provided on a lower portion of the seat back side portion is attached to a vehicle body or a rear seat for the purpose of fixing the seat back side portion (see Patent Document 1 and Patent Document 2).

CITATION LIST

Patent Literature
  Patent Document 1: JP S63-43250 B2
  Patent Document 2: JP S58-174027 A2

SUMMARY OF THE INVENTION

However, the lower portion of the above-mentioned seat back side portion is attached to the vehicle body or the rear seat at one portion, i.e., the attachment portion of the seat back side portion, so that the lower portion of the seat back side portion may wobble if a load from an occupant is applied to the seat back side portion.

In view of the above, it is an object of the present invention to provide a vehicle seat of which a seat back side portion does not wobble even if a load from an occupant is applied to the seat back side portion, so that the occupant can be held stably by the vehicle seat.

It is an object of the present invention to provide a vehicle seat in which the rigidity of the seat back side portion is enhanced to hold the occupant in a more stable manner.

The present invention proposed to attain one or more of the above objects provides a vehicle seat comprising a seat cushion and a seat back, wherein the seat back comprises a seat back main body portion and a seat back side portion disposed on one side of the seat back main body portion, and wherein the seat back side portion is fixed to a vehicle body or the seat cushion via a first attachment portion provided on a lower portion of the seat back side portion, and the seat back side portion comprises, at a position different from a position at which the first attachment portion is provided, a rotation-restricting portion configured to contact the vehicle body or the seat cushion to restrict rotation of the seat back side portion.

With this configuration, since the rotation-restricting portion is provided at a position different from the position at which the first attachment portion is provided, the seat back side portion does not wobble even if a load from an occupant is applied to the seat back side portion, so that the occupant can be held stably.

In the above vehicle seat, it is preferable that the rotation-restricting portion is provided at a position laterally spaced apart from the first attachment portion.

The seat back side portion is liable to rotate around the first attachment portion when it receives a load. However, providing the rotation-restricting portion at a position laterally spaced apart from the first attachment portion makes it easy to restrict rotation of the seat back side portion.

Further, in the above vehicle seat, it is preferable that the rotation-restricting portion is formed as a protrusion protruding downward from the lower portion of the seat back side portion and that at least part of the protrusion lies within a vertical range defined by upper and lower bounds of a space occupied by the seat cushion.

With this configuration, if the seat back side portion receives a load and is about to rotate around the first attachment portion, the protrusion contacts the seat cushion to restrict rotation of the seat back side portion. Therefore, the rotation of the seat back side portion can be restricted simply by providing the protrusion.

Further, in the configuration in which the rotation-restricting portion is formed as a protrusion protruding downward from the lower portion of the seat back side portion, it is preferable that a reinforcement portion is provided on a rear surface of the protrusion.

With this configuration, while the rigidity of the rotation-restricting portion is enhanced by the reinforcement portion provided on the rear surface of the protrusion, deformation of the seat cushion due to the presence of the reinforcement portion (e.g., reinforcement ribs) can be prevented at the front surface of the protrusion to which the seat cushion contacts.

Further, in the above vehicle seat, it is preferable that the seat back side portion comprises a main body portion having a surface facing an occupant and a flange portion extending rearward from a lower end of the main body portion and that the rotation-restricting portion is provided on the flange portion.

With this configuration, since the rotation-restricting portion is provided on the flange portion that is bent at and extends from the lower end of the main body portion, the rigidity of the rotation-restricting portion is enhanced to thereby suppress deformation of the rotation-restricting portion.

Further, in the configuration in which the seat back side portion comprises a flange portion extending rearward from the lower end of the main body portion, it is preferable that the flange portion connects the rotation-restricting portion and the first attachment portion.

With this configuration, the rigidities of the rotation-restricting portion and the first attachment portion can be enhanced by the flange portion.

Further, in the configuration in which the seat back side portion comprises a flange portion extending rearward from the lower end of the main body portion, it is preferable that the seat back side portion comprises reinforcement ribs extending to connect the main body portion and the flange portion.

With this configuration, since the reinforcement ribs enhance the rigidity of the flange portion to thereby suppress wobbling of the rotation-restricting portion and the first attachment portion relative to the main body portion, the occupant can be held in a more stable manner without wobbling of the seat back side portion.

Further, in the configuration in which the seat back side portion comprises reinforcement ribs extending to connect the main body portion and the flange portion, it is preferable that at least one of the reinforcement ribs is provided between the rotation-restricting portion and the first attachment portion.

With this configuration, the reinforcement rib reinforces that portion of the flange portion located between the rotation-restriction portion and the first attachment portion which is easily deformable when subjected to a load, the seat back side portion can be fixed in a more stable manner.

Further, in the above vehicle seat, it is preferable that a second attachment portion configured to fix the seat back side portion to the vehicle body or the seat back is provided on an upper portion of the seat back side portion and that the rotation-restricting portion is provided at a position offset from an imaginary line connecting the first attachment portion and the second attachment portion.

With this configuration, since the rotation-restricting portion is provided at a position offset from the imaginary line connecting the first attachment portion and the second attachment portion, rotation of the seat back side portion is restricted at a position offset from the axis of rotation of the seat back side portion, so that the rotation of the seat back side portion can be restricted more effectively.

Further, in the above vehicle seat, it is preferable that the rotation-restricting portion is provided laterally outward of the first attachment portion.

With this configuration, the rotation-restricting portion is provided laterally outward of the first attachment portion, at which position the seat back side portion is likely to be subjected to a load from the occupant, so that the rotation of the seat back side portion can be restricted more effectively.

Other features and advantages of the present invention will be apparent from the following description taken in conjunction with the accompanying drawings.

DESCRIPTION OF EMBODIMENTS

One embodiment of the present invention will be described in detail with reference made to the drawings, where necessary.

Figure 1:
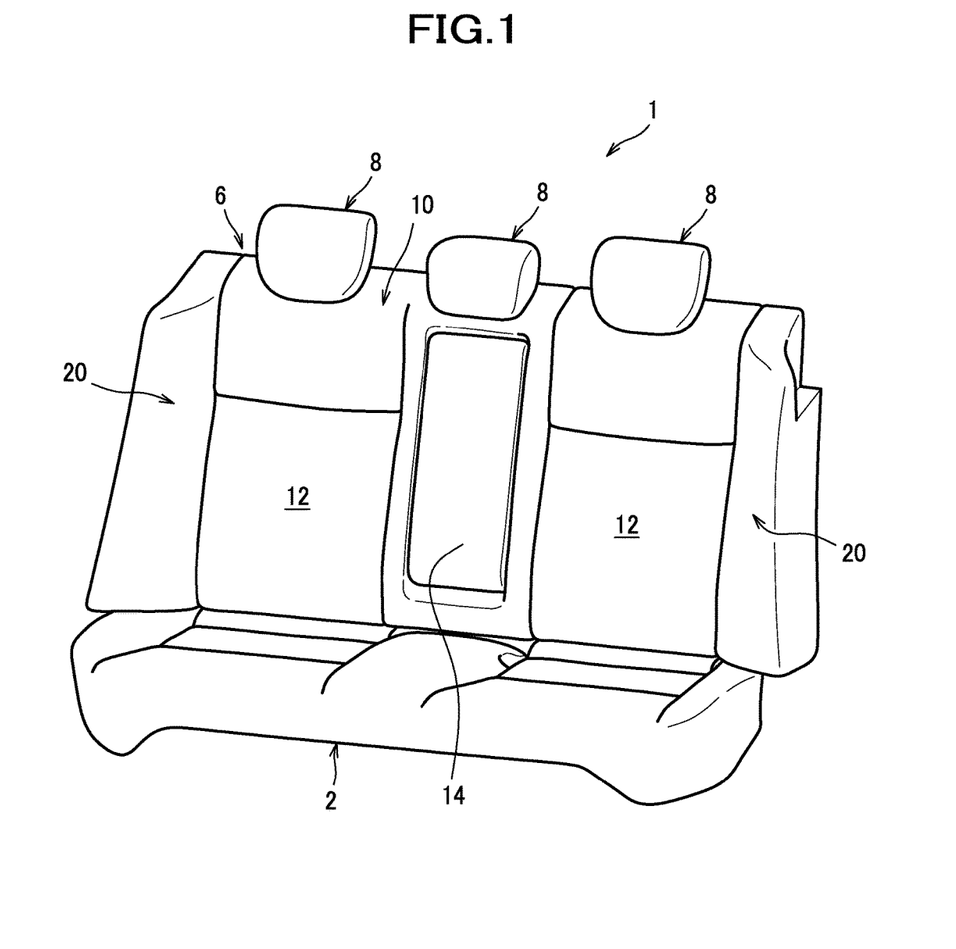
FIG. 1 is a perspective view of an automotive rear seat according to one embodiment of the present invention.

As seen in FIG. 1, an automotive rear seat 1 as an example of a vehicle seat is a seat used in a rear seat row of an automobile, and mainly includes a seat cushion 2, a seat back 6, and headrests 8.

In this description, directions such as front, rear, lateral (right and left), upper and lower are designated as from the viewpoint of an occupant seated on the automotive rear seat 1.

Figure 4:
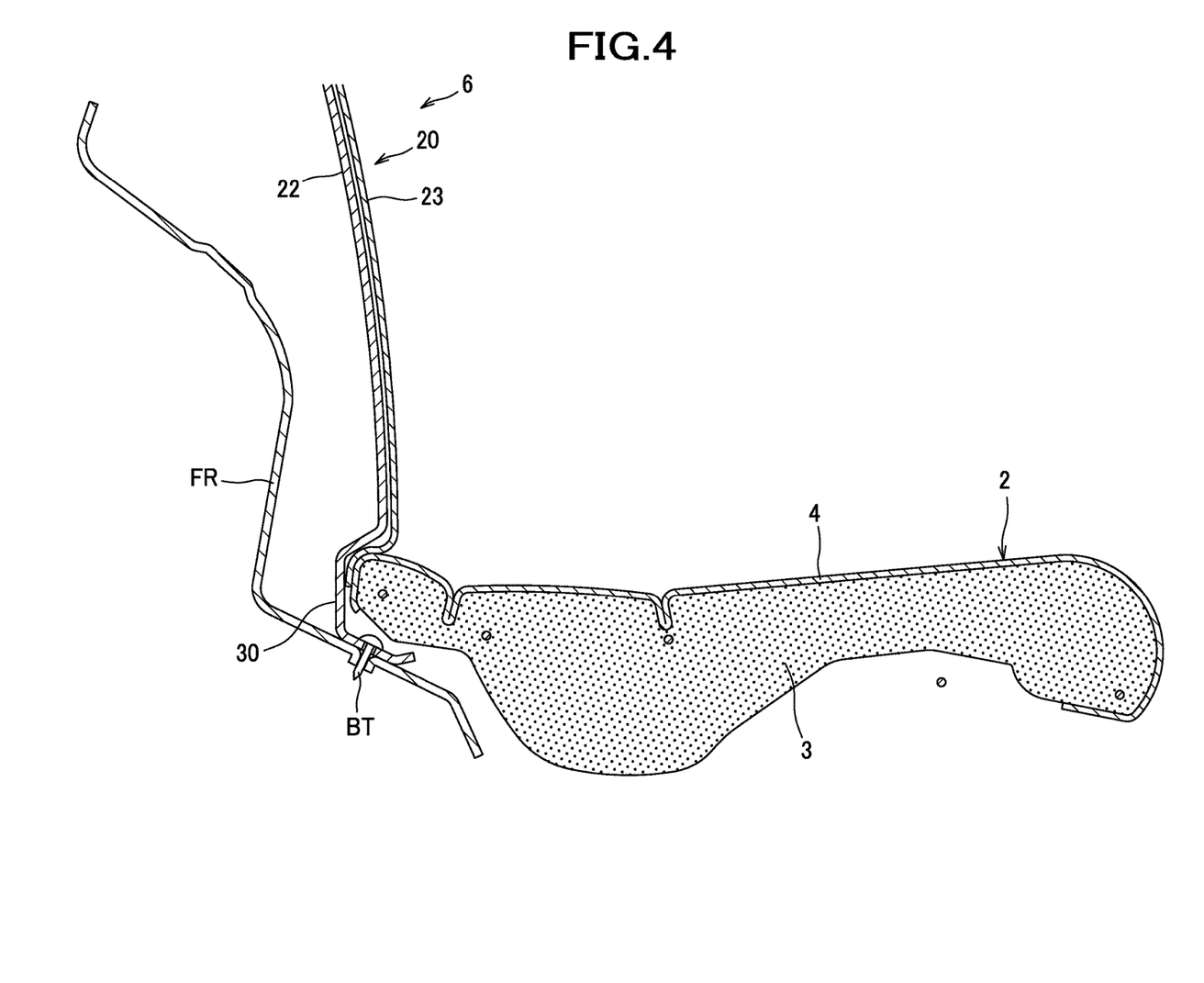
FIG. 4 is a sectional view taken along the line IV-IV of FIG. 3.
Figure 5:
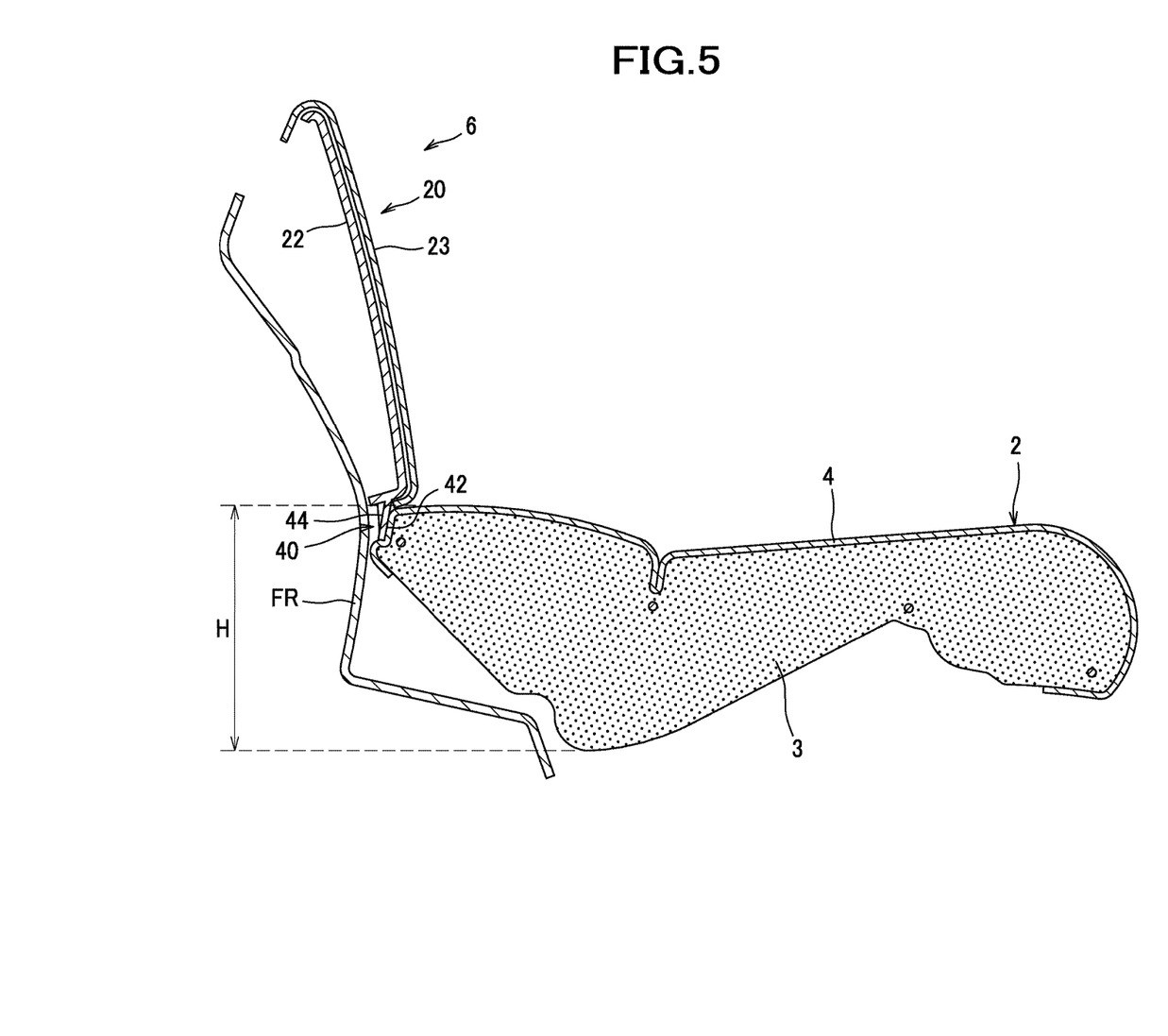
FIG. 5 is a sectional view taken along the line V-V of FIG. 3.

The seat cushion 2 is a member configured to allow an occupant to be seated thereon. As seen in FIGS. 4 and 5, the seat cushion 2 is configured such that a seat cushion frame (not shown) is covered with a seat cushion pad 3 consisting of a cushion material made of urethane form or the like and then upholstered with an outer skin material 4 made of synthetic leather or fabric.

The seat cushion 2 is fixed to a body frame FR as an example of a vehicle body, by bolts (not shown).

As seen in FIG. 1, the seat back 6 is a member configured to support the upper body of the occupant seated on the seat cushion 2, and includes a seat back main body portion 10 facing the back of the occupant, and seat back side portions 20 disposed on both right and left sides of the seat back main body portion 10.

The seat back main body portion 10 is configured such that a seat back frame (not shown) is covered with a seat back pad (not shown) consisting of a cushion material made of urethane form or the like and then upholstered with an outer skin material made of synthetic leather or fabric.

The seat back main body portion 10 has a contact surface 12 contacting a portion of the occupant's back ranging from his/her shoulder portion to lumber region, on each right and left side of the seat back main body portion 10. Provided at a central portion between the two contact surfaces 12 is an armrest 14 configured to be rotatable between a stowed position and a use position. If the armrest 14 is retracted into the stowed position, the automotive rear seat 1 can be used as a triple seat.

The seat back main body portion 10 is fixed to the body frame FR by bolts (not shown).

The seat back side portion 20 protrudes frontward farther than the contact surface 12 of the seat back main body portion 10 so as to support a side portion of the occupant seated on the seat cushion 2 from his/her shoulder portion to lumber region, and the lateral width thereof becomes gradually narrower with increasing distance from its rear side toward front side.

As seen in FIGS. 4 and 5, the seat back side portion 20 includes a seat back side portion main body 22 which constitutes a frame and is made of plastic, and an outer skin material 23 which covers the seat back side portion main body 22 and is made of synthetic leather or fabric.

Figure 2:
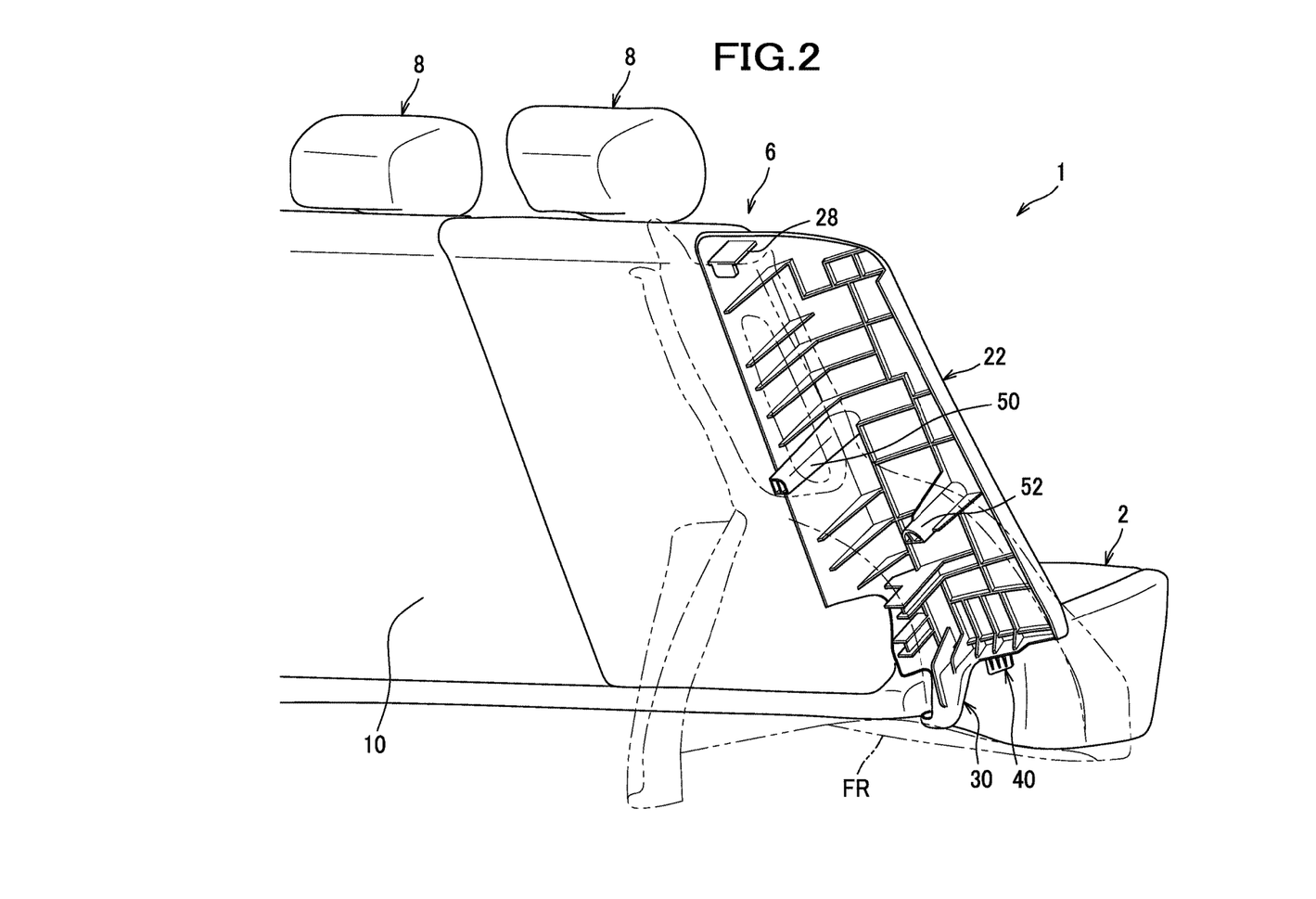
FIG. 2 is a partially broken perspective view of the automotive rear seat as viewed from the rear side with an outer skin material removed from a seat back side portion.
Figure 3:
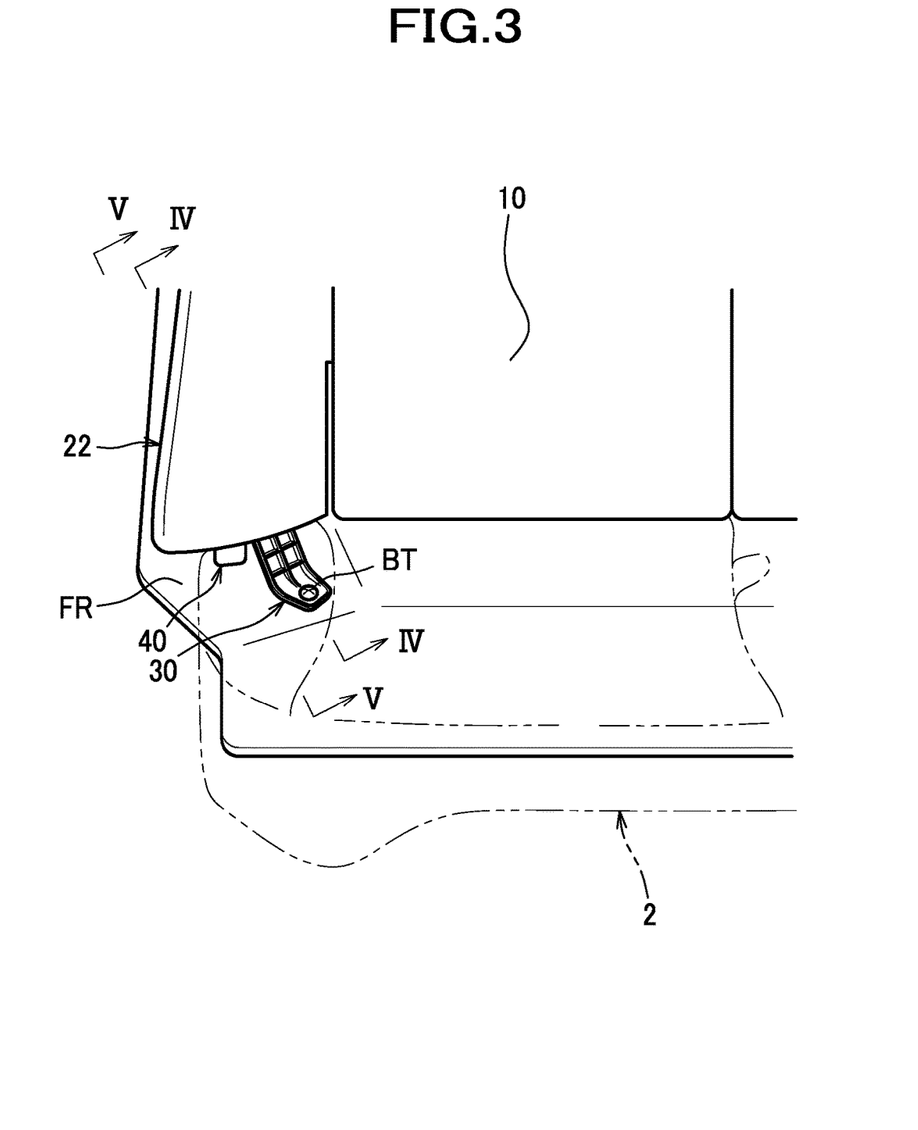
FIG. 3 is an enlarged view of principal parts and illustrating a state in which a seat cushion has been removed from the automotive rear seat of FIG. 2 to expose a body frame.

Further, as seen in FIGS. 2 and 3, a first attachment portion 30 for fixing a lower portion of the seat back side portion 20 to the body frame FR, and a rotation-restricting portion 40 to be described later are provided on a lower end portion of the seat back side portion main body 22, whereas a second attachment portion 28 for fixing an upper portion of the seat back side portion 20 to the body frame FR is provided on an upper end portion of the seat back side portion main body 22. An attachment hole 36 for insertion of a tapping bolt BT is formed in the first attachment portion 30 (see FIG. 6(b)). The second attachment portion 28 is engageable with the body frame FR via a downwardly protruding engagement portion (see FIG. 2 and FIG. 6(b)). As with the first attachment portion 30, the engagement portion of the second attachment portion 28 may have an attachment hole for insertion of a tapping bolt BT.

The seat back side portion 20 is fixed to the body frame FR by threading a tapping bolt BT into the first attachment portion 30 and fastening the bolt BT to the body frame FR, while the second attachment portion 28 is engaged with the body frame FR (see FIG. 2 and FIG. 4).

Next, with reference to FIGS. 6 and 7, the seat back side portion main body 22 which constitutes a characterizing portion of the present invention will be described in detail.

As seen in FIGS. 6(a) and 6(b), the seat back side portion main body 22 is shaped such that the lateral width thereof becomes gradually wider from its upper portion toward its lower portion and that it protrudes gradually frontward with increasing distance from its laterally inner side to its laterally outer side. Further, the seat back side portion main body 22 has a front surface 24 that faces the occupant and is formed as a smooth surface.

In order to suppress wobbling of the seat back side portion main body 22 at its center portion in the upper-lower direction while it is fixed to the body frame FR, the seat back side portion main body 22 includes protrusions 50, 52 configured to protrude from the rear surface 26 thereof and to contact the body frame FR. Further, a plurality of reinforcement ribs 54, 56, 58 as an example of a reinforcement portion are provided on the rear surface 26 of the seat back side portion main body 22.

As seen in FIG. 6(b), the plurality of reinforcement ribs 54 are provided on the rear surface 26 of the seat back side portion main body 22 so as to extend in the vertical direction, and a plurality of reinforcement ribs 56 are provided horizontally so as to intersect with the reinforcement ribs 54.

The seat back side portion main body 22 further includes a flange portion 60 that is bent at and extend from the lower end thereof, and a plurality of reinforcement ribs 58 are provided to connect the rear surface 26 of the seat back side portion main body 22 and the flange portion 60.

The first attachment portion 30 configured to fix the seat back side portion main body 22 to the body frame FR is provided on the lower end of the seat back side portion main body 22.

The first attachment portion 30 protrudes obliquely downward from the flange portion 60. As seen in FIGS. 6(a) and 6(b), an outer surface 32 of the first attachment portion 30 faces rearward, and an inner surface 34 of the first attachment portion 30 faces frontward. Further, the first attachment portion 30 is bent in a frontward and inward direction in proximity to the lower end portion thereof, so that an attachment surface 35 to be fixed to the body frame FR is provided. An attachment hole 36 for insertion of a tapping bolt BT is formed in the attachment surface 35.

The first attachment portion 30 has a flange portion 38 extending from the edge of the outer surface 32 toward the inner surface 34 side and reaching to the distal end portion of the attachment surface 35.

As seen in FIG. 6(a), reinforcement ribs 39 are provided vertically and horizontally on the inner surface 34 of the first attachment portion 30.

Figure 7:
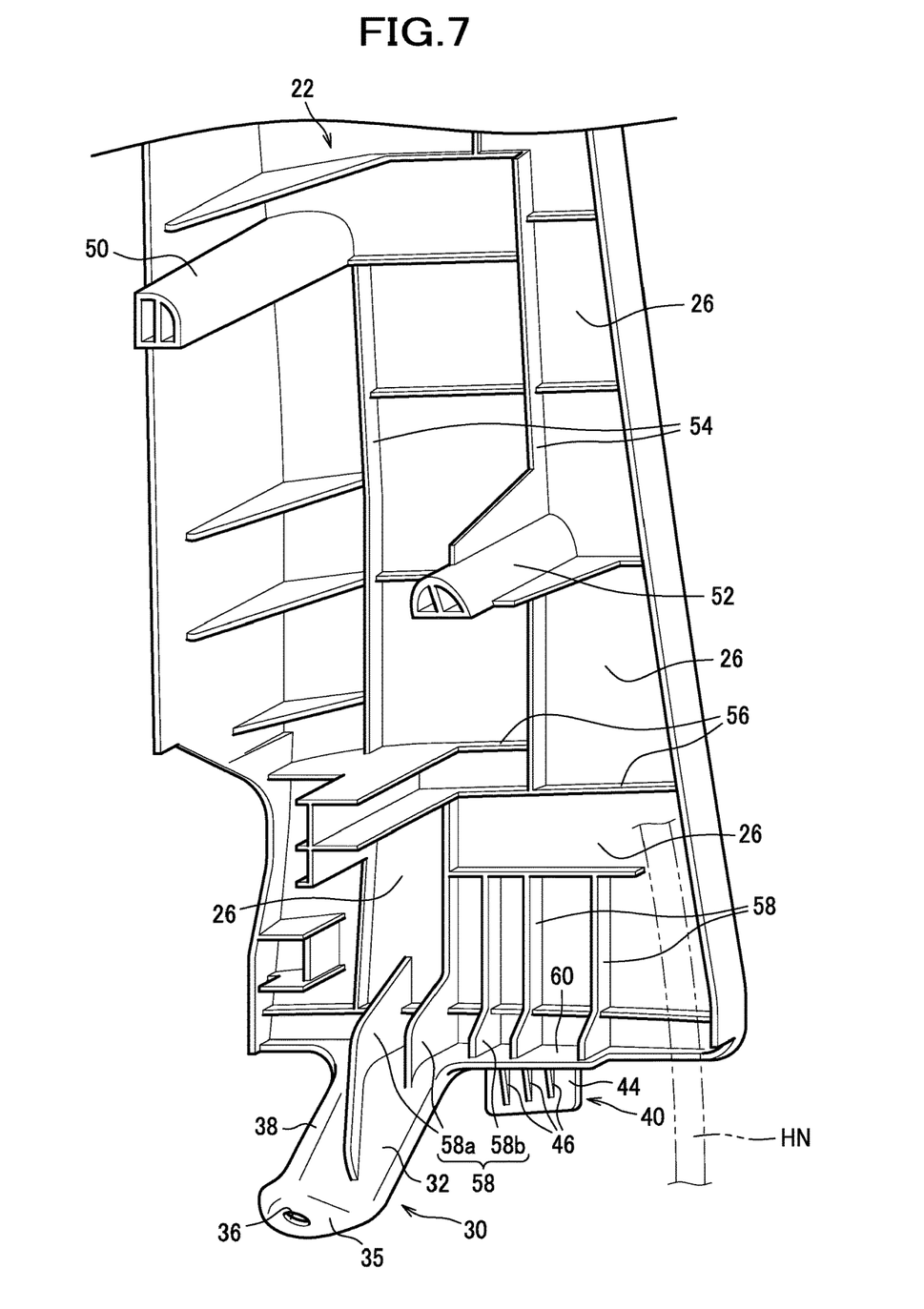
FIG. 7 is an enlarged view of principal parts and illustrating the rear surface of the seat back side portion main body.

Further, as seen in FIG. 7, at least one reinforcement rib 58a (two reinforcement ribs 58b in this embodiment) among the plurality of reinforcement ribs 58 is provided on the rear surface 26 of the seat back side portion main body 22 so as to extend beyond the flange portion 60 and to connect the seat back side portion main body 22, the flange portion 60, and the outer surface 32 of the first attachment portion 30. Further, at least one reinforcement rib 58b (one reinforcement rib 58b in this embodiment) among the plurality of reinforcement ribs 58 is provided between the rotation-restricting portion 40 and the first attachment portion 30.

As described above, since the first attachment portion 30 has the flange portion 38 provided on the outer peripheral portion of the first attachment portion 30 and extending to the distal end portion of the attachment surface 35, and the reinforcement ribs 39 and the reinforcement ribs 58a are provided respectively on the inner surface 34 and the outer surface 32 of the first attachment portion 30, the rigidity of the first attachment portion 30 is enhanced, so that the rigidity at the attached portion between the seat back side portion main body 22 and the body frame FR can be improved.

Figure 6:
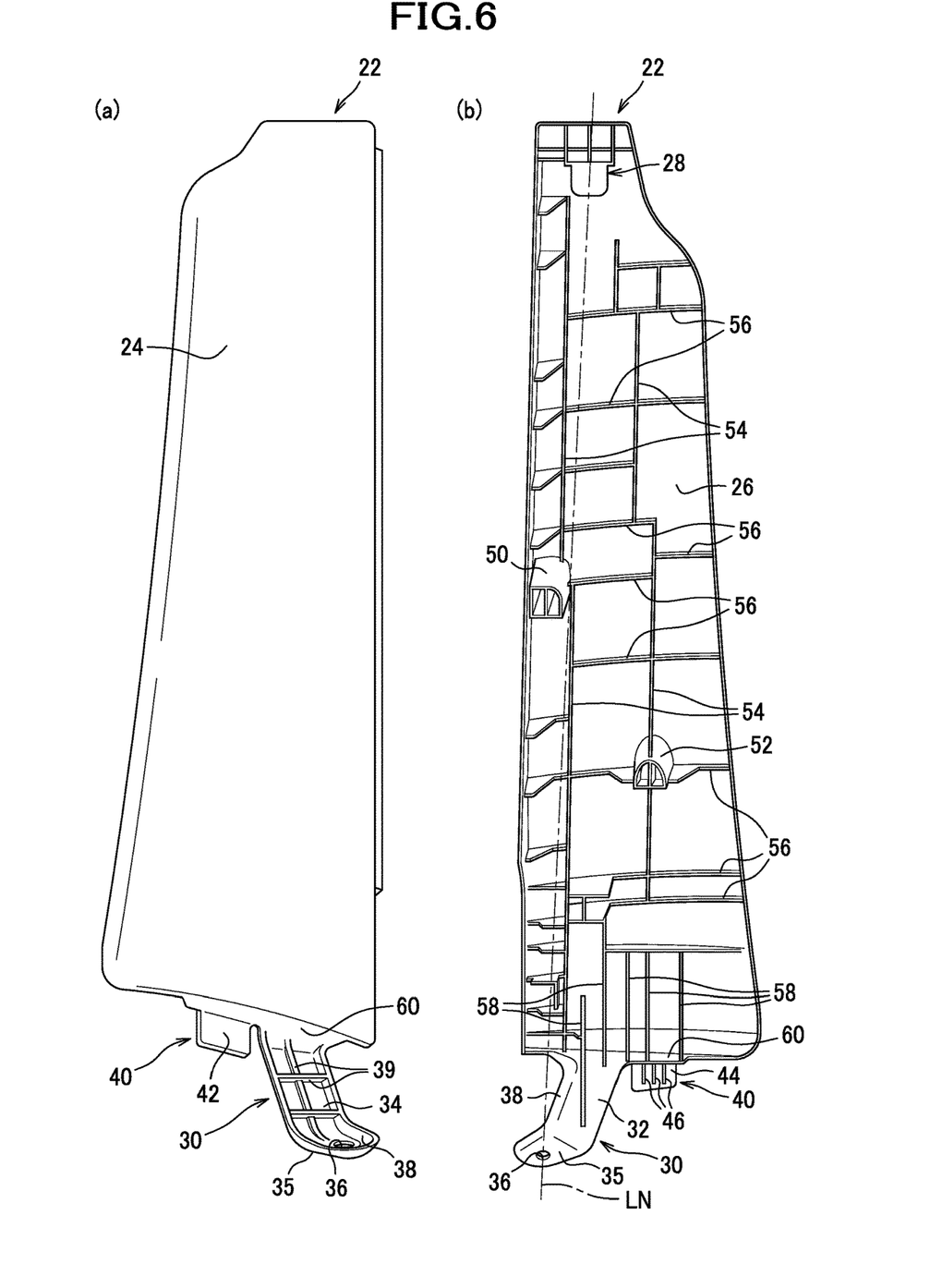
FIG. 6 includes (a) a view of a seat back side portion main body as viewed from the front side, and (b) a view of the seat back side portion main body as viewed from the reverse side.

As seen in FIG. 6, the rotation-restricting portion 40 is a member for restricting rotation of the seat back side portion 20 when a load is applied from an occupant to the seat back side portion 20; the rotation-restricting portion 40 is provided on the lower end of the seat back side portion main body 22, at a position different from the position at which the first attachment portion 30 is provided.

To be more specific, the rotation-restricting portion 40 is formed as a protrusion that protrudes downward from the flange portion 60 of the seat back side portion main body 22; the protrusion is located at a position laterally spaced apart from the first attachment portion 30, more specifically, at a position laterally outward of the first attachment portion 30, and the protrusion lies within the vertical range defined by upper and lower bounds of a space occupied by the seat cushion 2 (i.e., height range H in FIG. 5). Further, as seen in FIG. 6(b), the rotation-restricting portion 40 is provided at a position offset from an imaginary line LN connecting the first attachment portion 30 and the second attachment portion 28.

As seen in FIG. 5, the rotation-restricting portion 40 is positioned such that the front surface 42 thereof contacts, and is pressed against, the side surface of the rear portion of the seat cushion 2 whereas the rear surface 44 thereof is slightly spaced apart from the body frame FR (more specifically, from an upper portion of the rear-side wheel house). Since the rotation-restricting portion 40 is pressed against the seat cushion 2, wobbling of the seat back side portion 20 in the lateral direction can be minimized, and the occupant does not feel an uncomfortable feeling when he/she leans against the seat back side portion 20. On one hand, when a load from the occupant is applied to a portion of the seat back side portion 20 laterally inward of the first attachment portion 30, the rotation-restricting portion 40 is restricted by the side surface of the rear portion of the seat cushion 2, so that the seat back side portion 20 hardly wobbles. On the other hand, when a large load from the occupant is applied to a portion of the seat back side portion 20 laterally outward of the first attachment portion 30, the rear surface 44 of the rotation-restricting portion 40 is brought into contact with the body frame FR, so that the rotation of the seat back side portion 20 can be restricted.

As seen in FIG. 6, the front surface 42 of the rotation-restricting portion 40 that faces the seat cushion 2 is formed as a smooth surface, and the reinforcement ribs 46 are provided on the rear surface 44 of the rotation-restricting portion 40 so as to extend in the vertical direction. In this way, the reinforcement ribs 46 are provided only on the rear surface 44 of the rotation-restricting portion 40, so that the rigidity of the rotation-restricting portion 40 can be enhanced and deformation of the seat cushion 2 due to the presence of the reinforcement ribs 46 can be prevented.

Further, the rotation-restricting portion 40 is provided on the lower end of the seat back side portion main body 22 at a laterally center portion thereof but not at a laterally end portion thereof. If the rotation-restricting portion 40 is provided on a laterally end portion of the lower end of the seat back side portion main body 22, that is, around the corner portion of the lower end, it is necessary that the outer skin material 23 for covering the seat back side portion main body 22 have a slit for allowing the rotation-restricting portion 40 to be exposed. This may lead to a decreased strength of the outer skin material 23. However, according to this embodiment, since the rotation-restricting portion 40 is provided on the lower end of the seat back side portion main body 22 at a position laterally spaced apart from the end portion, it is not necessary to provide a slit around the corner portion of the outer skin material 23 on which portion a tensile force is likely to be exerted. Therefore, the outer skin material 23 is less likely to deform, and thus the workability for attaching the outer skin material 23 can be improved.

Further, other members such as a harness HN (see FIG. 7) may be disposed at a position around the lower end corner portion of the seat back side portion main body 22; for this reason, the rotation-restricting portion 40 is provided on a laterally center portion, so that the rotation-restricting portion 40 can be disposed between the harness HN and the first attachment portion 30 while preventing interference of the rotation-restricting portion 40 with the other members such as the harness HN.

The following advantageous effects can be obtained in the automotive rear seat 1 explained above.

Since the seat back side portion 20 is fixed to the body frame FR via the first attachment portion 30 provided on the lower end of the seat back side portion main body 22, and the seat back side portion 20 includes, at a position different from a position at which the first attachment portion 30 is provided, the rotation-restricting portion 40 configured to contact the seat cushion 2 (and also the body frame FR depending on a load) to restrict rotation of the seat back side portion 20, the seat back side portion does not wobble even if a load is applied from the occupant to the seat back side portion, so that the occupant can be held stably.

The seat back side portion 20 is liable to rotate around the first attachment portion 30 when it receives a load from the occupant. However, providing the rotation-restricting portion 40 at a position laterally spaced apart from the first attachment portion 30 makes it easy to restrict rotation of the seat back side portion 20.

Since the rotation-restricting portion 40 is formed as a protrusion protruding downward from the lower portion of the seat back side portion 20, and at least part of the protrusion lies within the vertical range (height range H) defined by upper and lower bounds of a space occupied by the seat cushion 2, if the seat back side portion 20 receives a load and is about to rotate around the first attachment portion 30, the protrusion contacts the seat cushion 2 to thereby restrict rotation of the seat back side portion 20. Therefore, the rotation of the seat back side portion 20 can be restricted simply by providing the protrusion.

While the rigidity of the rotation-restricting portion 40 is enhanced by the reinforcement ribs 46 provided only on the rear surface 44 of the protrusion, deformation of the seat cushion 2 due to the presence of the reinforcement ribs can be prevented at the front surface 42 of the protrusion to which the seat cushion contacts.

The seat back side portion 20 includes the seat back side portion main body 22 having a surface (front surface 24) facing the occupant, and a flange portion 60 extending rearward from the lower end of the seat back side portion main body 22, and the rotation-restricting portion 40 is provided on the flange portion 60. With this configuration, since the rotation-restricting portion 40 is provided on the flange portion 60 that is bent at and extends from the lower end of the seat back side portion main body 22, the rigidity of the rotation-restricting portion 40 is enhanced to thereby suppress deformation of the rotation-restricting portion 40.

Since the flange portion 60 connects the rotation-restricting portion 40 and the first attachment portion 30, the rigidities of the rotation-restricting portion 40 and the first attachment portion 30 can be enhanced.

Providing the reinforcement ribs 58 extending to connect the seat back side portion main body 22 and the flange portion 60 makes it possible to enhance the rigidity of the flange portion 60 to thereby suppress wobbling of the rotation-restricting portion 40 and the first attachment portion 30 relative to the seat back side portion main body 22. Therefore, the occupant can be held in a more stable manner without wobbling of the seat back side portion 20.

Since at least one reinforcement rib 58b among the plurality of reinforcement ribs 58 is provided between the rotation-restricting portion 40 and the first attachment portion 30, the reinforcement rib 58b reinforces that portion of the flange portion 60 located between the rotation-restricting portion 40 and the first attachment portion 30 which is easily deformable when subjected to a load, so that the seat back side portion 20 can be fixed in a more stable manner.

Since the second attachment portion 28 configured to fix the seat back side portion 20 to the body frame FR is provided on the seat back side portion main body 22, and the rotation-restricting portion 40 is provided at a position offset from the imaginary line LN connecting the first attachment portion 30 and the second attachment portion 28, rotation of the seat back side portion 20 is restricted at a position offset from the axis of rotation of the seat back side portion 20, so that the rotation of the seat back side portion 20 can be restricted more effectively.

Since the rotation-restricting portion 40 is provided laterally outward of the first attachment portion 30, at which position the seat back side portion 20 is likely to be subjected to a load from the occupant, the rotation of the seat back side portion 20 can be restricted more effectively.

Although one embodiment of the present invention has been described above, the present invention is not limited to the above-described embodiment. It is to be understood that various changes and modifications may be made to any of the specific configurations where necessary without departing from the gist of the present invention.

In the above embodiment, the seat back side portion main body 22 is fixed to the body frame FR as an example of a vehicle body. However, the vehicle body is not limited to a metal body and may be a plastic member fixed to the metal body.

Further, the seat back side portion main body 22 may be fixed to the seat back 6 and the seat cushion 2. As with a rear seat disclosed in Patent Documents 1 and 2 in which the seat cushion is slidable in the front-rear direction to change the angle of the seat back, it is preferable that the first attachment portion 30 of the seat back side portion main body 22 is fixed to the seat cushion 2 whereas the second attachment portion 28 of the seat back side portion main body 22 is fixed to the seat back 6.

In the above embodiment, the seat back side portion main body 22 contacts the seat cushion 2 and is fixed to the body frame FR in such a manner that the front surface 42 of the rotation-restricting portion 40 is pressed against the seat cushion 2 whereas the rear surface 44 of the rotation-restricting portion 40 is spaced apart from the body frame FR. However, as long as rotation of the seat back side portion 20 is restricted when a load is applied from the occupant to the seat back side portion 20, the positional relation between the rotation-restricting portion 40 and the seat cushion 2 and the body frame FR is not limited to that described in the above embodiment.

For example, the rotation-restricting portion 40 may be disposed at a position slightly spaced apart from the seat cushion 2 and the body frame FR, and if the seat back side portion 20 rotates slightly when it receives a load from the occupant, the rotation-restricting portion 40 is brought into contact with one of the seat cushion 2 and the body frame FR to restrict rotation of the seat back side portion 20.

Further, the rotation-restricting portion 40 may be held between the seat cushion 2 and the body frame FR such that rotation of the seat back side portion 20 is restricted by the rotation-restricting portion 40 that is in contact with both of the seat cushion 2 and the body frame FR.

In the above embodiment, the first attachment portion 30 and the rotation-restricting portion 40 provided on the lower portion of the seat back side portion main body 22 protrude from the flange portion 60 provided on the lower end of the seat back side portion main body 22. However, the first attachment portion and the rotation-restricting portion may directly protrude downward from the lower portion of the seat back side portion main body 22.

In the above embodiment, the reinforcement ribs 39, 46, 54, 56, 58 are provided as reinforcement portions. However, the reinforcement portions are not limited to the reinforcement ribs. For example, the first attachment portion 30, the rotation-restricting portion 40 and the seat back side portion main body 22 may be thickened so as to provide a locally thickened portion at a portion where increased strength is required.

In the above embodiment, since the seat back side portion main body 22, the first attachment portion 30 and the rotation-restricting portion 40 are made of plastic, they are preferably made by integral molding. However, the first attachment portion 30 made of metal and/or the rotation-restricting portion 40 made of metal may be assembled with the plastic seat back side portion main body 22.

In the above embodiment, the automotive rear seat 1 has been described as an example of a vehicle seat. However, the present invention is not limited to the automotive rear seat, and may be applicable to other vehicle seats, such as a front seat of a truck and other seats of rail cars, ships, aircraft, and etc.

The invention claimed is:

1. A vehicle seat comprising a seat cushion and a seat back,
   wherein the seat back comprises a seat back main body portion, and a seat back side portion disposed on one side of the seat back main body portion, and
   wherein the seat back side portion comprises:
      a front wall protruding frontward farther than the seat back main body portion;
      a boss protruding from a rear surface of the front wall and configured to contact a body frame of a vehicle; and
      a lower protruding portion protruding downward from a lower surface of the seat back side portion and configured to contact the body frame,
      wherein in a right-left direction, the boss is disposed in a position overlapping a horizontal range in which the lower protruding portion is disposed.

2. The vehicle seat according to claim 1, wherein the rear surface of the front wall has a reinforcement rib extending in the right-left direction, and
   wherein in an upper-lower direction orthogonal to the right-left direction, the reinforcement rib is disposed in a position overlapping a vertical range in which the boss is disposed.

3. The vehicle seat according to claim 2, wherein the seat back side portion further comprises a side wall extending rearward from a lateral end of the front wall, and
   wherein the reinforcement rib is connected to the side wall of the seat back side portion.

4. The vehicle seat according to claim 1, wherein the boss is a hollow boss, and the boss comprises an outer perimetrical portion and a cavity.

5. The vehicle seat according to claim 4, wherein the boss has a partition wall extending in an upper-lower direction orthogonal to the right-left direction, and the cavity is divided by the partition wall.

6. The vehicle seat according to claim 4, wherein the outer perimetrical portion of the boss has an arch-shaped upper surface.

7. The vehicle seat according to claim 6, wherein a lower surface of the boss extends in the right-left direction.

8. The vehicle seat according to claim 1, wherein an attachment portion is provided on an upper end portion of the seat back side portion, the attachment portion having an end portion extending downward and being configured to fix the seat back side portion to the body frame or the seat back.

9. The vehicle seat according to claim 1, wherein in the right-left direction, the boss is disposed in a position shifted toward a door of the vehicle from a laterally central portion of the seat back side portion.

10. A vehicle seat comprising a seat cushion and a seat back,
    wherein the seat back comprises a seat back main body portion, and a seat back side portion disposed on one side of the seat back main body portion, the seat back side portion protruding frontward farther than the seat back main body portion,
    wherein the seat back side portion comprises: a boss protruding from a rear surface of the seat back side portion and configured to contact a body frame of a vehicle; a reinforcement rib provided on the rear surface of the seat back side portion and extending in a right-left direction; and a lower protruding portion protruding downward from a lower surface of the seat back side portion and configured to contact the body frame,
    wherein in the right-left direction, the boss is disposed in a position overlapping a horizontal range in which the lower protruding portion is disposed, and
    wherein in an upper-lower direction orthogonal to the right-left direction, the reinforcement rib is disposed in a position overlapping a vertical range in which the boss is disposed.

11. The vehicle seat according to claim 10, wherein the seat back side portion comprises a front wall on which the boss and the reinforcement rib are provided, and a side wall extending rearward from a lateral end of the front wall, and
    wherein the reinforcement rib is connected to the side wall of the seat back side portion.

12. The vehicle seat according to claim 10, wherein the boss is a hollow boss, and the boss comprises an outer perimetrical portion and a cavity.

13. The vehicle seat according to claim 12, wherein the boss has a partition wall extending in an upper-lower direction orthogonal to the right-left direction, and the cavity is divided by the partition wall.

14. The vehicle seat according to claim 10, wherein an attachment portion is provided on an upper end portion of the seat back side portion, the attachment portion having an end portion extending downward and being configured to fix the seat back side portion to the body frame or the seat back.

15. The vehicle seat according to claim 10, wherein in the right-left direction, the boss is disposed in a position shifted toward a door of the vehicle from a laterally central portion of the seat back side portion.

16. A vehicle seat comprising a seat cushion and a seat back,
    wherein the seat back comprises a seat back main body portion, and a seat back side portion disposed on one side of the seat back main body portion, the seat back side portion protruding frontward farther than the seat back main body portion, wherein the seat back side portion comprises: a boss protruding from a rear surface of the seat back side portion and configured to contact a body frame of a vehicle; and a lower protruding portion protruding downward from a lower surface of the seat back side portion and configured to contact the body frame, wherein the boss is a hollow boss, and the boss comprises an outer perimetrical portion and a cavity, and wherein in a right-left direction, the boss is disposed in a position overlapping a horizontal range in which the lower protruding portion is disposed.

17. The vehicle seat according to claim 16, wherein the boss has a partition wall extending in an upper-lower direction orthogonal to the right-left direction, and the cavity is divided by the partition wall.

18. The vehicle seat according to claim 16, wherein the outer perimetrical portion of the boss has an arch-shaped upper surface.

19. The vehicle seat according to claim 18, wherein a lower surface of the boss extends in the right-left direction.

20. The vehicle seat according to claim 16, wherein an attachment portion is provided on an upper end portion of the seat back side portion, the attachment portion having an end portion extending downward and being configured to fix the seat back side portion to the body frame or the seat back.

* * * * *